United States Patent [19]

Paules et al.

[11] Patent Number: 5,073,281

[45] Date of Patent: Dec. 17, 1991

[54] PELLETIZED RICE HULL ASH AND BENTONITE CLAY INSULATION

[76] Inventors: John R. Paules, 10180 Woodbury Dr.; William R. Curran, 10152 Woodbury Dr., both of Wexford, Pa. 15090

[21] Appl. No.: 348,809

[22] Filed: May 8, 1989

[51] Int. Cl.$^5$ .................. F04B 1/74; C04B 14/00; C04B 35/02

[52] U.S. Cl. .................. 252/62; 106/400; 106/401; 106/480; 501/97; 501/116; 501/128

[58] Field of Search .................. 252/62; 106/400, 401, 106/486; 501/97, 100. 116, 128

[56] References Cited

U.S. PATENT DOCUMENTS

| | | | |
|---|---|---|---|
| 4,166,748 | 9/1979 | Cassens, Jr. | 106/66 |
| 4,295,891 | 10/1981 | Daussan et al. | 501/99 |
| 4,440,575 | 4/1984 | Daussan et al. | 106/38.22 |
| 4,571,389 | 2/1986 | Goodwin et al. | 501/85 |
| 4,659,679 | 4/1987 | Falk | 501/99 |

FOREIGN PATENT DOCUMENTS

| | | |
|---|---|---|
| 2847807 | 5/1979 | Fed. Rep. of Germany . |
| 2496696 | 6/1982 | France . |

*Primary Examiner*—Paul Lieberman
*Assistant Examiner*—James M. Silbarmann
*Attorney, Agent, or Firm*—Webb, Burden, Ziesenheim & Webb

[57] ABSTRACT

The present invention comprises rice hull ash which is pelletized subsequent to its admixture with a bentonite clay binder. A preferred product according to the present invention is pelletized rice hull ash which contains both bentonite clay and organic cornstarch binders. The bentonite clay contains approximately 58–68% $SiO_2$, 18–21% $Al_2O_3$, 2.5–2.8% $Fe_2O_3$/FeO, 2.5–3.2% MgO, 0.1–1.0% Cao, 1.5–2.7% $Na_2O$, 0.2–0.45% $K_2O$, and 4.5–9.0% free $H_2O$. Insulator pellets according to the present invention, when placed atop molten steel in ladles or tundishes, insulate well and do not smoke or generate unwanted dust.

8 Claims, No Drawings

PELLETIZED RICE HULL ASH AND BENTONITE CLAY INSULATION

FIELD OF THE INVENTION

The invention relates to low-cost, lightweight inexpensive pelletized insulation material particularly suitable for insulating molten steel in ladles and tundishes.

BACKGROUND OF THE INVENTION

Rice hull ash has been used widely, in steel mills, as an insulating cover on tundishes and ladles containing molten steel. The rice hull ash is a good insulator because it is inexpensive, it flows over and covers the steel surface well, and it does not get crusty or lumpy during use. As a commodity, rice hull ash is produced by Agrilectric in Lake Charles, La., as the end product of the combustion of rice hulls in a boiler which feeds a power plant.

The major problem with rice hull ash is that, because of its low bulk density (15 to 20 lb/ft$^3$) and small particle size, some of the ash becomes airborne when it comes in contact with hot metal. The resulting dust is believed not to be a health hazard, but it is annoying to operating personnel.

Previous attempts to improve the properties of rice hull ash for molten steel insulation have met with limited success. Although it is known to produce rice hull ash briquettes with 1) sodium silicate, 2) starch, 3) cement dust/starch and 4) lime/molasses binders, these briquettes do not break down (i.e., spontaneously subdivide into smaller pieces), spread or insulate well when transferred to the surface of molten steel. It is also known to produce rice hull ash pellets with an industrial molasses binder, and such pellets do break down, spread and insulate well on the molten steel surface. However, pellets containing molasses binder smoke excessively when exposed to liquid steel temperatures. Applicants are also aware of other rice hull ash pelletizing attempts which have failed, which failure is probably also attributable to the composition of the binder. These unacceptable binders include lime, lime/lignosol admixtures, starch, starch/lignin admixtures, and wood pulp. (For example, U.S. Pat. No. 4,440,575 to Daussan et al. discloses pelletizing rice hull ash with wood pulp or with admixtures containing a starchy binder and clay. Unfortunately, these and all other organic binders smoke excessively during use, yielding an unsatisfactory insulation material.)

Accordingly, a need remains for a pelletized rice hull ash product which overcomes the disadvantages of the prior art.

SUMMARY OF THE INVENTION

In order to meet this need, the present invention comprises rice hull ash which is pelletized subsequent to its admixture with a bentonite clay binder. A preferred product according to the present invention is pelletized rice hull ash which contains both bentonite clay and organic cornstarch binders. The bentonite clay contains approximately 58–64% $SiO_2$, 18–21% $Al_2O_3$, 2.5–2.8% $Fe_2O_3$/FeO, 2.5–3.2% MgO, 0.1–1.0% CaO, 1.5–2.7% $Na_2O$, 0.2–0.45% $K_2O$, and 4.5–9.0% free $H_2O$. Insulator pellets according to the present invention insulate well on the molten steel surface, and do not smoke or generate unwanted dust.

DETAILED DESCRIPTION OF THE INVENTION

Addition of bentonite clay (58–64% $SiO_2$, 18–21%) $Al_2O_3$, 2.5–2.8% $Fe_2O_3$/FeO, 2.5–3.2% MgO, 0.1–1.0% CaO, 1.5–2.7% $Na_2O$, 0.2–0.45% $K_2O$, and 4.5–9.0% free $H_2O$) to rice hull ash prior to pelletizing yields a product with outstanding characteristics, yet with low cost comparable to prior art rice hull ash insulating materials. A preferred product according to the present invention is a pelletized rice hull ash which contains both bentonite clay and organic cornstarch binders. On a final pellet weight basis, pellets according to the present invention contain about 87.5–96% by weight rice hull ash, about 3–8% by weight bentonite clay, about 2% or less by weight cornstarch, and about 1–2.5% by weight retained water.

High speed, high impact agglomeration process equipment is necessary to prepare the final pelletized rice hull ash product. Two suitable mixing processes are identified in the Examples, below. Batch or continuous mixing may be used, and a fluidized bed dryer, turbodryer or other equipment can remove the water necessary to yield the final product. However, mixing of the constituents must take place with an adequate (but not excessive) amount of water. During mixing, between 40 and 50%, preferably 41–42%, by weight of the rice hull ash/bentonite clay/cornstarch/water admixture must be water. With the correct amount of water, pellets form with an average pellet size of about 8 mesh (0.093 inch, 2380 microns) and a pellet size distribution of about 6–12 mesh.

Pellets are ordinarily packed in 20 lb. bags, which can be transported to the ladle or tundish site. Insulator pellets according to the present invention also have utility in other short- and long-term insulation applications. In addition to insulation applications, the present pellets are highly absorbent to liquids. The present compositions are therefore well suited to toxic and hazardous waste cleanup applications, because they do not create dust problems.

The invention is more particularly described in the following Examples.

EXAMPLE I

An 8 inch diameter×36 inch long Teledyne-Readco pin mixer having a top speed of about 700 r.p.m. was fitted with a rice hull ash feeder, a binder hopper/feeder and a valved flexible water line. The rice hull ash feeder was an AccuRate Model 1202 volumetric feeder (with on/off switch and feed rate control) and the binder hopper/feeder was AccuRate Model 310 volumetric feeder, essentially the same but smaller than the Model 1202. The binder hopper was kept full of an admixture containing 8 parts by weight bentonite clay and 1 part by weight organic cornstarch.

Batches of rice hull ash pellets were prepared, and the amounts of constituents and the results of these batches are summarized in Table I. The pin mixer was operated at or near top speed throughout.

TABLE 1

| | | | | | | | | |
|---|---|---|---|---|---|---|---|---|
| | | Water | | | | | | Pellet |
| Ash | Binder | Feed | Mixer | Inlet | Exit | Inlet | Exit | moisture |

TABLE 1-continued

RICE HULL ASH PELLETIZING PILOT PLANT OPERATING DATA

| Date | Shift | Hour | Feed Rate (lb/min) | Feed Rate (lb/min) | Rate (gal/min) | Speed (% of rpm) | pellet Temp. (F) | pellet Temp. (F) | air Temp. (F) | air Temp. (F) | before drying (%) |
|---|---|---|---|---|---|---|---|---|---|---|---|
| 6/08/88 | 7-3 | 0700 | 3.23 | 0.32 | 0.36 | 65 | | 190 | 600 | 200 | |
| 6/08/88 | 7-3 | 1000 | 3.23 | 0.32 | 0.36 | 65 | | 400 | 590 | 190 | |
| 6/08/88 | 7-3 | 1100 | 3.23 | 0.32 | 0.36 | 65 | | 250 | 590 | 165 | 42.40 |
| 6/08/88 | 7-3 | 1200 | 3.23 | 0.32 | 0.36 | 65 | | 380 | 600 | 230 | 41.60 |
| 6/08/88 | 7-3 | 1300 | 3.23 | 0.32 | 0.36 | 65 | | 185 | 595 | 200 | 43.00 |
| 6/08/88 | 7-3 | 1400 | 3.23 | 0.32 | 0.36 | 65 | | 190 | 600 | 165 | 43.20 |
| 6/08/88 | 3-11 | 1500 | 3.23 | 0.32 | 0.36 | 65 | | 510 | 600 | 225 | |
| 6/08/88 | 3-11 | 1600 | 3.23 | 0.32 | 0.36 | 65 | | 325 | 600 | 250 | |
| 6/08/88 | 3-11 | 1700 | 3.23 | 0.32 | 0.36 | 65 | | 225 | 600 | 250 | 43.10 |
| 6/08/88 | 3-11 | 1800 | 3.23 | 0.32 | 0.36 | 65 | | 425 | 600 | 225 | 42.60 |
| 6/08/88 | 3-11 | 1900 | 3.23 | 0.32 | 0.36 | 65 | | 225 | 600 | 125 | 43.00 |
| 6/08/88 | 3-11 | 2000 | 3.23 | 0.32 | 0.36 | 65 | | 225 | 600 | 150 | 37.00 |
| 6/08/88 | 3-11 | 2100 | 3.23 | 0.32 | 0.36 | 65 | | 400 | 600 | 225 | 43.10 |
| 6/09/88 | 7-3 | 0700 | 3.23 | 0.32 | 0.36 | 70 | | 265 | 600 | 170 | |
| 6/09/88 | 7-3 | 0800 | 3.23 | 0.32 | 0.36 | 70 | | 345 | 600 | 195 | 43.70 |
| 6/09/88 | 7-3 | 0900 | 3.23 | 0.32 | 0.36 | 70 | | 200 | 600 | 160 | 42.60 |
| 6/09/88 | 7-3 | 1000 | 3.23 | 0.32 | 0.36 | 70 | | 335 | 590 | 225 | |
| 6/09/88 | 7-3 | 1100 | 3.23 | 0.32 | 0.36 | 70 | | 180 | 600 | 180 | 43.30 |
| 6/09/88 | 7-3 | 1200 | 3.23 | 0.32 | 0.36 | 70 | | 420 | 600 | 225 | 44.40 |
| 6/09/88 | 7-3 | 1300 | 3.23 | 0.32 | 0.36 | 70 | | 265 | 600 | 155 | 41.30 |
| 6/09/88 | 7-3 | 1400 | 3.23 | 0.32 | 0.36 | 70 | | 325 | 600 | 200 | |
| 6/09/88 | 3-11 | 1600 | 3.23 | 0.32 | 0.36 | 70 | 500 | 475 | 600 | 225 | 42.10 |
| 6/09/88 | 3-11 | 1700 | 3.23 | 0.32 | 0.36 | 70 | 230 | 250 | 600 | 150 | 41.80 |
| 6/09/88 | 3-11 | 1800 | 3.23 | 0.32 | 0.36 | 70 | 500 | 475 | 600 | 225 | 42.30 |
| 6/09/88 | 3-11 | 1900 | 3.23 | 0.32 | 0.36 | 70 | 225 | 300 | 600 | 175 | 42.10 |
| 6/09/88 | 3-11 | 2000 | 3.23 | 0.32 | 0.36 | 70 | 200 | 240 | 600 | 125 | 43.00 |
| 6/09/88 | 3-11 | 2100 | 3.23 | 0.32 | 0.36 | 70 | 225 | 300 | 600 | 125 | 43.80 |
| 6/09/88 | 3-11 | 2200 | 3.23 | 0.32 | 0.36 | 70 | 500 | 475 | 600 | 250 | 43.70 |
| 6/10/88 | 7-3 | 700 | 3.23 | 0.32 | 0.36 | 70 | 365 | 380 | 600 | 185 | |
| 6/10/88 | 7-3 | 800 | 3.23 | 0.32 | 0.36 | 70 | 270 | 195 | 590 | 200 | 42.70 |
| 6/10/88 | 7-3 | 1000 | 3.23 | 0.32 | 0.36 | 70 | 335 | 250 | 575 | 280 | 48.30 |
| 6/10/88 | 7-3 | 1100 | 3.23 | 0.32 | 0.36 | 70 | 225 | 200 | 590 | 235 | 41.50 |
| 6/10/88 | 7-3 | 1200 | 3.23 | 0.32 | 0.36 | 70 | 215 | 275 | 600 | 205 | 42.20 |
| 6/10/88 | 7-3 | 1300 | 3.23 | 0.32 | 0.36 | 70 | 210 | 225 | 600 | 160 | 42.90 |
| 6/10/88 | 7-3 | 1400 | 3.23 | 0.32 | 0.36 | 70 | 215 | 215 | 600 | 175 | |
| 6/10/88 | 3-11 | 1600 | 3.23 | 0.32 | 0.36 | 70 | 225 | 300 | 600 | 220 | 44.00 |
| 6/10/88 | 3-11 | 1700 | 3.23 | 0.32 | 0.36 | 70 | 200 | 300 | 600 | 160 | 41.80 |
| 6/10/88 | 3-11 | 1800 | 3.23 | 0.32 | 0.36 | 70 | 200 | 300 | 600 | 240 | 41.70 |
| 6/10/88 | 3-11 | 1900 | 3.23 | 0.32 | 0.36 | 70 | 220 | 260 | 600 | 200 | 42.90 |
| 6/10/88 | 3-11 | 2000 | 3.23 | 0.32 | 0.36 | 70 | 200 | 240 | 600 | 260 | 41.60 |
| 6/10/88 | 3-11 | 2100 | 3.23 | 0.32 | 0.36 | 70 | 200 | 225 | 600 | 150 | 42.50 |
| 6/13/88 | 7-3 | 700 | 3.23 | 0.32 | 0.36 | 70 | 225 | 260 | 600 | 175 | |
| 6/13/88 | 7-3 | 800 | 3.23 | 0.32 | 0.36 | 70 | 230 | 265 | 600 | 175 | 41.80 |
| 6/13/88 | 7-3 | 900 | 3.23 | 0.32 | 0.36 | 70 | 300 | 175 | 600 | 240 | 42.10 |
| 6/13/88 | 7-3 | 1100 | 3.23 | 0.32 | 0.36 | 70 | 225 | 265 | 600 | 175 | 42.70 |
| 6/13/88 | 7-3 | 1200 | 3.23 | 0.32 | 0.36 | 70 | 225 | 175 | 600 | 200 | 41.70 |
| 6/13/88 | 7-3 | 1300 | 3.23 | 0.32 | 0.36 | 70 | 235 | 325 | 600 | 180 | 40.80 |
| 6/13/88 | 7-3 | 1400 | 3.23 | 0.32 | 0.36 | 70 | 235 | 300 | 600 | 175 | 41.40 |
| 6/13/88 | 3-11 | 1500 | 3.23 | 0.32 | 0.36 | 70 | 325 | 275 | 600 | 300 | 40.10 |
| 6/13/88 | 3-11 | 1600 | 3.23 | 0.32 | 0.36 | 90 | 230 | 285 | 585 | 175 | 40.40 |
| 6/13/88 | 3-11 | 1700 | 3.23 | 0.32 | 0.36 | 80 | 235 | 300 | 600 | 175 | 40.40 |
| 6/13/88 | 3-11 | 1800 | 3.23 | 0.32 | 0.36 | 80 | 235 | 275 | 585 | 175 | 41.00 |
| 6/13/88 | 3-11 | 1900 | 3.23 | 0.32 | 0.36 | 80 | 235 | 225 | 600 | 165 | 39.70 |
| 6/13/88 | 3-11 | 2000 | 3.23 | 0.32 | 0.36 | 80 | 225 | 450 | 600 | 185 | 37.00 |

| Date | Shift | Hour | Moist pellets >6 mesh (%) | Moist pellets <200 mesh (%) | Dry pellet moisture (%) | Dry Pellets >6 mesh (%) | Dry Pellets <200 mesh (%) | Dry Pellets bulk density (lb/ft³) |
|---|---|---|---|---|---|---|---|---|
| 6/08/88 | 7-3 | 0700 | | | | | | |
| 6/08/88 | 7-3 | 1000 | | | 8.50 | 21.18 | 4.23 | |
| 6/08/88 | 7-3 | 1100 | 19.93 | 9.64 | 4.40 | 22.39 | 1.98 | |
| 6/08/88 | 7-3 | 1200 | 47.25 | 9.44 | 20.20 | 51.60 | 5.51 | |
| 6/08/88 | 7-3 | 1300 | 46.88 | 7.68 | 10.60 | 37.11 | 3.65 | |
| 6/08/88 | 7-3 | 1400 | 56.09 | 7.44 | 15.50 | 35.06 | 4.81 | |
| 6/08/88 | 3-11 | 1500 | | | | | | |
| 6/08/88 | 3-11 | 1600 | | | 2.20 | 35.91 | 4.67 | |
| 6/08/88 | 3-11 | 1700 | 26.45 | 6.75 | 0.70 | 8.20 | 2.00 | |
| 6/08/88 | 3-11 | 1800 | 30.91 | 4.53 | 5.60 | 23.28 | 2.92 | |
| 6/08/88 | 3-11 | 1900 | 16.61 | 4.32 | 5.00 | 28.57 | 3.21 | |
| 6/08/88 | 3-11 | 2000 | 67.64 | 6.37 | 3.60 | 25.73 | 1.96 | |
| 6/08/88 | 3-11 | 2100 | 45.80 | 5.72 | 7.20 | 36.34 | 3.99 | |
| 6/09/88 | 7-3 | 0700 | | | 5.70 | 35.14 | 2.66 | 31.2 |
| 6/09/88 | 7-3 | 0800 | 43.55 | 3.20 | 5.50 | 27.17 | 1.78 | |
| 6/09/88 | 7-3 | 0900 | 45.26 | 5.19 | 14.00 | 32.92 | 2.32 | |
| 6/09/88 | 7-3 | 1000 | | | 15.90 | 44.78 | 3.21 | |

TABLE 1-continued

RICE HULL ASH PELLETIZING PILOT PLANT OPERATING DATA

| | | | | | | | | |
|---|---|---|---|---|---|---|---|---|
| 6/09/88 | 7-3 | 1100 | 46.35 | 6.53 | 24.10 | 82.16 | 2.60 | |
| 6/09/88 | 7-3 | 1200 | 76.91 | 2.53 | 12.00 | 29.36 | 1.39 | |
| 6/09/88 | 7-3 | 1300 | 10.56 | 3.22 | 5.30 | 19.15 | 1.47 | |
| 6/09/88 | 7-3 | 1400 | | | 10.90 | 32.59 | 4.28 | |
| 6/09/88 | 3-11 | 1600 | 38.96 | 4.55 | 3.60 | 24.72 | 2.68 | |
| 6/09/88 | 3-11 | 1700 | 29.75 | 3.24 | 2.40 | 18.35 | 1.74 | |
| 6/09/88 | 3-11 | 1800 | 21.69 | 6.10 | 0.50 | 5.16 | 1.81 | |
| 6/09/88 | 3-11 | 1900 | 41.34 | 2.47 | 2.40 | 22.37 | 3.23 | 32.2 |
| 6/09/88 | 3-11 | 2000 | 42.41 | 2.84 | 1.40 | 6.68 | 1.85 | |
| 6/09/88 | 3-11 | 2100 | 42.79 | 1.16 | 1.20 | 6.62 | 0.85 | |
| 6/09/88 | 3-11 | 2200 | 40.87 | 4.92 | 2.70 | 12.92 | 1.46 | |
| 6/10/88 | 7-3 | 700 | | | 14.70 | 28.19 | 4.24 | 35.0 |
| 6/10/88 | 7-3 | 800 | 32.77 | 2.82 | 9.80 | 18.04 | 3.79 | |
| 6/10/88 | 7-3 | 1000 | 37.25 | 2.74 | 10.70 | 17.04 | 3.28 | |
| 6/10/88 | 7-3 | 1100 | 12.35 | 2.45 | 12.30 | 26.95 | 2.90 | |
| 6/10/88 | 7-3 | 1200 | 41.81 | 3.62 | 11.10 | 26.93 | 1.94 | |
| 6/10/88 | 7-3 | 1300 | 36.03 | 2.64 | 10.90 | 28.17 | 2.06 | |
| 6/10/88 | 7-3 | 1400 | | | | | | |
| 6/10/88 | 3-11 | 1600 | 62.70 | 7.48 | 2.20 | 14.82 | 2.37 | |
| 6/10/88 | 3-11 | 1700 | 20.67 | 8.79 | 3.30 | 19.03 | 2.17 | |
| 6/10/88 | 3-11 | 1800 | 30.12 | 6.66 | 2.00 | 15.49 | 4.01 | |
| 6/10/88 | 3-11 | 1900 | 43.34 | 6.41 | 2.60 | 10.35 | 2.45 | 32.9 |
| 6/10/88 | 3-11 | 2000 | 25.58 | 6.43 | 3.60 | 18.52 | 2.01 | |
| 6/10/88 | 3-11 | 2100 | 33.46 | 6.14 | 2.30 | 10.64 | 1.91 | |
| 6/13/88 | 7-3 | 700 | | | 4.40 | 11.24 | 2.41 | |
| 6/13/88 | 7-3 | 800 | 29.31 | 6.28 | 4.00 | 9.67 | 2.46 | |
| 6/13/88 | 7-3 | 900 | 43.21 | 6.55 | 2.70 | 7.79 | 2.97 | |
| 6/13/88 | 7-3 | 1100 | 44.00 | 6.90 | 4.60 | 9.81 | 1.87 | 33.2 |
| 6/13/88 | 7-3 | 1200 | 19.43 | 5.92 | 1.40 | 9.32 | 2.33 | |
| 6/13/88 | 7-3 | 1300 | 24.14 | 6.06 | 2.10 | 14.95 | 3.07 | |
| 6/13/88 | 7-3 | 1400 | 55.48 | 5.86 | 1.40 | 11.54 | 2.17 | |
| 6/13/88 | 3-11 | 1500 | 14.03 | 4.79 | 2.30 | 37.22 | 0.79 | |
| 6/13/88 | 3-11 | 1600 | 20.79 | 2.71 | 8.70 | 42.44 | 2.13 | 35.1 |
| 6/13/88 | 3-11 | 1700 | 18.77 | 4.47 | 2.00 | 24.09 | 0.73 | |
| 6/13/88 | 3-11 | 1800 | 67.01 | 3.01 | 3.90 | 22.00 | 2.10 | |
| 6/13/88 | 3-11 | 1900 | 15.68 | 2.26 | 2.20 | 16.18 | 0.68 | |
| 6/13/88 | 3-11 | 2000 | 2.00 | 2.80 | 3.20 | 18.97 | 1.65 | |

Some of the moist pellets thus prepared were conveyed to a Carrier vibrating fluidized bed dryer fitted with a vibrating feeder. Air was heated in a gas burner/blower unit and introduced under pressure into a 1 ft. × 10 ft. plenum. This hot air (600° F.) was blown through a perforated deck on which the material was mechanically vibrated. The velocity of air through the holes fluidized the bed and dried the pellets effectively in 2-6 min. About 15 percent by weight fines were blown through the exhaust system of the dryer and were available (but were not in fact actually used for) recycling into the rice hull ash feeder. A simple conveyor belt was used to transport the dried pellets from the discharge port of the dryer into a holding container. The material exiting the dryer was very hot (as high as 300° F.) and care was taken to prevent skin contact.

Some of the moist pellets were dried in a laboratory scale Wyssmont Turbo-dryer. This drying was successful but was more expensive than the fluidized bed drying and did not enable separation of fines from pellets.

COMPARATIVE EXAMPLE I

The process according to Example I was followed except different types and amounts of binder were used. A first batch was prepared to yield an end product containing 2%/1% bentonite clay/sodium silicate. A second batch final composition included 1.5%/1% bentonite clay/sodium silicate, and a third included 1.5%/0.5% bentonite clay/starch. None of the pellets were satisfactory due to the presence of excessive fines.

EXAMPLE II

The sequence of product runs according to Example I is repeated, except tungsten carbide tips and threads are added to the pins in the pin mixer, to increase the longevity and to enable quick and routine maintenance of the pin mixer. The tungsten carbide tips prevent excessive wear from the abrasive rice hull ash.

EXAMPLE III

Several 20 lb. sacks were filled with the batches of rice hull ash pellets prepared according to Example I, and were transported to steel mill sites for testing. One tundish and two ladles were covered, when full of molten steel, with the rice hull ash pellets. The pellets according to the present invention performed successfully, i.e., provided appropriate insulation of the molten steel without dusting or smoking.

EXPERIMENTAL CONCLUSIONS

The above-described operating experience with a pin mixer and vibrating fluid bed dryer provided important information about the feasibility of scaling this system up to a large plant. Specifically:

1) The water feed rate into a pin mixer is critical and must be carefully controlled, ideally at 41-42% by weight, to prevent excessive fines or large particles which are difficult to dry;

2) rice hull ash is very abrasive and pin mixer pins should be made of abrasion resistant materials; pins must be replaced when excessively worn;

3) There is an upper size limit (about 3/16 inch in diameter) on pellets which can be dried in a fluid bed dryer; pellets above this size should be screened off for re-drying; and 4) The amount of fines collected in a fluid bed dryer may be as high as 20% of the solid material charged into the dryer.

Although the invention has been described particularly with respect to specific materials and methods, above, the invention is only to be limited insofar as is set forth in the accompanying claims.

We claim:

1. A rice hull ash pellet product comprising an absorbent pellet consisting essentially of rice hull ash and bentonite clay binder wherein said bentonite clay binder contains approximately 58-64% $SiO_2$, 18-21% $Al_2O_3$, 2.5-2.8% $Fe_2O_3$/FeO, 2.5-3.2% MgO, 0.1-1.0% CaO, 1.5-2.7% $Na_2O$, 0.2-0.45% $K_2O$, and 4.5-9.0% free $H_2O$, and further wherein the pelletized product contains about 87.5-96% by weight rice hull ash, about 3-8% by weight bentonite clay, up to 2% by weight cornstarch, and about 1-2.5% by weight water.

2. The rice hull ash pelletized product according to claim 1 wherein said cornstarch is present in the amount of about 1% by weight of the pellet.

3. The rice hull ash pelletized product according to claim 2 wherein said bentonite clay is present in the amount of about 8% by weight of the pellet and the pelletized product contains a maximum of about 15% by weight fines.

4. An absorbent pellet consisting essentially of rice hull ash and bentonite clay binder, wherein said bentonite clay binder contains approximately 58-64% $SiO_2$, 18-21% $Al_2O_3$, 2.5-2.8% $Fe_2O_3$/FeO, 2.5-3.2% MgO, 0.1-1.0% CaO, 1.5-2.7% $Na_2O$, 0.2-0.45% $K_2O$, and 4.5-9.0% free $H_2O$, and further wherein the pelletized product contains about 87.5-96% by weight rice hull ash, about 3-8% by weight bentonite clay, up to 2% by weight cornstarch, and about 1-2.5% by weight water.

5. The absorbent pellet according to claim 1 wherein said cornstarch is present in the amount of about 1% by weight of the pellet.

6. The absorbent pellet according to claim 2 wherein said bentonite clay is present in the amount of about 8% by weight of the pellet and the pelletized product contains a maximum of about 15% by weight fines.

7. A method for preparing insulator pellets comprising:
a) admixing ingredients consisting essentially of 87.5-96% by weight rice hull ash, about 3-8% by weight bentonite clay, up to 2% by weight cornstarch and about 1-2.5% by weight water until pellets form, said bentonite clay binder containing approximately 58-64% $SiO_2$, 18-21% $Al_2O_3$, 2.5-2.8% $Fe_2O_3$/FeO, 2.5-3.2% MgO, 0.1-1.0% CaO, 1.5-2.7% $Na_2O$, 0.2-0.45% $K_2O$, and 4.5-9.0% free $H_2O$; and
b) drying the pelletized admixture of step a) to yield a product containing a plurality of insulator pellets.

8. The method according to claim 7 wherein step b) further comprises the step of:
b) drying the pelletized admixture of step a) at about 600° F. for 2-6 min.

* * * * *

UNITED STATES PATENT AND TRADEMARK OFFICE
CERTIFICATE OF CORRECTION

PATENT NO. : 5,073,281

DATED : December 17, 1991

INVENTOR(S) : John R. Paules and William R. Curran

It is certified that error appears in the above-identified patent and that said Letters Patent is hereby corrected as shown below:

Abstract Line 6 "68%" should read --64%--.

Abstract Line 8 "Cao" should read --CaO--.

Claim 1 Line 6 Column 7 "pellet" should read --pelletized--.

Signed and Sealed this

First Day of June, 1993

Attest:

MICHAEL K. KIRK

*Attesting Officer*  Acting Commissioner of Patents and Trademarks